(12) United States Patent
Chen

(10) Patent No.: US 8,165,936 B2
(45) Date of Patent: Apr. 24, 2012

(54) PAYROLL SYSTEM AND METHOD

(75) Inventor: Chia-Chieh Chen, Milpitas, CA (US)

(73) Assignee: C&S Technologies, Inc., San Jose, CA (US)

( * ) Notice: Subject to any disclaimer, the term of this patent is extended or adjusted under 35 U.S.C. 154(b) by 0 days.

(21) Appl. No.: 12/362,754

(22) Filed: Jan. 30, 2009

(65) Prior Publication Data

US 2009/0210330 A1    Aug. 20, 2009

Related U.S. Application Data

(60) Provisional application No. 61/025,607, filed on Feb. 19, 2008.

(51) Int. Cl.
G06F 17/22  (2006.01)
(52) U.S. Cl. ............. 705/31; 705/19; 705/32; 705/36 T
(58) Field of Classification Search ................... None
See application file for complete search history.

(56) References Cited

U.S. PATENT DOCUMENTS

| | | | |
|---|---|---|---|
| 5,600,554 A | 2/1997 | Williams | |
| 6,401,079 B1* | 6/2002 | Kahn et al. | 705/30 |
| 6,411,938 B1* | 6/2002 | Gates et al. | 705/30 |
| 6,681,210 B2 | 1/2004 | Kelly | |
| 6,751,650 B1* | 6/2004 | Finch et al. | 709/203 |
| 6,764,013 B2 | 7/2004 | Ben-Aissa | |
| 6,829,588 B1 | 12/2004 | Stoutenburg et al. | |
| 6,850,905 B2 | 2/2005 | Kelly | |
| 6,944,652 B1* | 9/2005 | Finch et al. | 709/219 |
| 7,089,200 B2 | 8/2006 | Bode | |
| 7,233,919 B1 | 6/2007 | Braberg et al. | |
| 7,539,635 B1* | 5/2009 | Peak et al. | 705/31 |
| 2002/0184148 A1 | 12/2002 | Kahn et al. | |
| 2003/0074311 A1* | 4/2003 | Saylors et al. | 705/39 |
| 2003/0167193 A1 | 9/2003 | Jones et al. | |
| 2004/0049436 A1 | 3/2004 | Brand et al. | |
| 2004/0267595 A1* | 12/2004 | Woodings et al. | 705/9 |
| 2005/0010501 A1 | 1/2005 | Ward, Jr. | |
| 2005/0177477 A1 | 8/2005 | Arghavanifard et al. | |
| 2006/0020545 A1 | 1/2006 | Lindheimer et al. | |
| 2006/0111990 A1 | 5/2006 | Cohen et al. | |
| 2007/0055592 A1 | 3/2007 | Vu | |
| 2007/0061251 A1 | 3/2007 | Watkins | |
| 2007/0136156 A1 | 6/2007 | Seeley et al. | |
| 2007/0174194 A1 | 7/2007 | Chappell | |
| 2007/0185792 A1 | 8/2007 | Naib et al. | |
| 2008/0021799 A1 | 1/2008 | Blowers | |
| 2009/0192926 A1* | 7/2009 | Tarapata | 705/32 |
| 2010/0299235 A1* | 11/2010 | Marshall | 705/32 |
| 2011/0029418 A1* | 2/2011 | Marshall | 705/30 |

* cited by examiner

*Primary Examiner* — Ryan Zeender
*Assistant Examiner* — Fateh Obaid
(74) *Attorney, Agent, or Firm* — Jackson DeMarco Tidus Peckenpaugh; Roland Tong

(57) ABSTRACT

A paycheck-centric payroll system and method for generating, accumulating and reporting on payroll information including payroll deductions and payroll tax deposits.

8 Claims, 4 Drawing Sheets

PAYROLL SYSTEM AND METHOD

PRIORITY CLAIM

This application claims the benefit of U.S. Provisional Patent Application No. 61/025,607 filed Feb. 19, 2008 entitled PAYROLL SYSTEM AND METHOD.

BACKGROUND OF THE INVENTION

1. Field of the Invention

The present invention relates to a paycheck-centric payroll system and method for generating, accumulating and reporting on payroll information including payroll deductions.

2. Discussion of the Related Art

As shown in FIG. 1, traditional payroll systems include a payroll setup phase 100a which precedes a payroll processing phase 100b. In the payroll setup phase, company (employer) 102 and employee 104 setup information that does not change from pay period to pay period is entered. From this information, a payroll setup 106 is created. If there are no new employees since the last payroll was run, preparation for payroll processing 107, 109b includes prior payroll reconciliation 108 and achieving a state ready for payroll processing 110. If there are new employees to be added since the last payroll was run, preparation for payroll processing 107, 109a includes an enter new employee activity 105, employee setup 104, payroll setup 106, payroll reconciliation 108 and achieving a state ready for payroll processing 110.

Payroll processing 100b is ready to begin after payroll setup reaches the ready for payroll processing state 110. Payroll processing steps include making time card/earning entries for each employee 112, generating and printing paychecks 114, accounting for payroll tax deposits 116 and payroll reporting (USIRS form 941) 118.

As can be seen, the sequential, employee-list-centric model of traditional payroll systems requires a lengthy setup procedure before any paychecks can be generated. Such systems are not user friendly, require the assistance of human technical/customer support during at least the setup phase and are inflexible. But, operators of such systems are the dominant providers of payroll system services in the United States. Such operators have little motivation to upset their current success by developing and offering payroll systems that eliminate the need for the highly profitable administrative and setup services that are the cornerstone of their businesses.

SUMMARY OF THE INVENTION

The present invention provides an improved payroll management system and method. Various embodiments are described below.

The improved payroll management system enables rapid production of paychecks by persons having only minimal training while retaining considerably more operational flexibility than traditional payroll systems. This approach does not require a traditional setup phase to generate paychecks and manage payroll reports and payroll deposits. New users can use stand-alone and/or internet versions of the system to prepare and print paychecks in a few minutes. Payroll tax deposit coupons and payroll reports can be generated at times convenient to the user.

In a web-enabled or Internet embodiment of the invention, a fully functional e-commerce website is provided. Here, users register, prepare and print paychecks immediately from their own laser printer using blank check stocks. Employee, company and payroll information are entered on an as-needed basis and paychecks can be saved at a user's discretion. Paychecks can be viewed, edited, deleted, summarized or exported easily by users as needed. Users now have substantial control of their paychecks and payroll and related data.

Payroll reports are generated, for example, based on paychecks issued in the reporting period. In addition, the payroll reports may be filed with the IRS or selected states electronically. If the payroll reports are generated on paper for filing, the users have the option of re-generating the same reports should any paychecks need to be edited. However, in some embodiments once a paycheck is used to generate reports and the reports have been e-filed through the IRS/State, the paychecks will be marked as non-delete, non-edit. Any change must be made with amended returns. And in an embodiment, the system is completely transparent and open to the user/account owner.

In an embodiment, a payroll paycheck management method comprises multiple steps; configuring a data processor to receive and process employer and employee information and to generate selected paycheck information including statutory deductions, cumulative statutory deductions, and paycheck amount, the configured data processor being initially void of any information about employers and employees; making particular employer and employee information available to the data processor for the first time when the employee's first paycheck from the employer is requested; the paycheck request resulting in the assembly of an information record sufficient to populate the employer, employee and paycheck information fields of a paycheck; and, saving an indication of selected portions of the information record for use in tracking cumulative paycheck information.

In an embodiment, a payroll paycheck management system comprises an information network interconnecting first and second data processors. The second data processor is configured to receive and process employer and employee information and to generate selected paycheck information including statutory deductions, cumulative statutory deductions, and paycheck amount, the configuration being initially void of any information about employers and employees. Employer and employee information entered at a man-machine interface of the first data processor is transferred to the second data processor via the information network said information being made available to the second data processor for the first time when the employee's first paycheck from the employer is requested. The paycheck request results in the assembly of an information record sufficient to populate the employer, employee and paycheck information fields of a paycheck. Saved is an indication of selected portions of the information record for use in tracking cumulative paycheck information.

In an embodiment, a payroll paycheck management method comprises multiple steps; avoiding substantially non-concurrent data processor setup prior to entry of new employers; and, configuring a data processor for managing payroll paychecks such that when employer identification information is entered for the first time, employee identification information and employee hours and pay-rate are substantially concurrently entered.

In some embodiments the above payroll paycheck management method further comprises the steps of; avoiding substantially non-concurrent data processor setup prior to entry of new employees; and, configuring the data processor for managing payroll paychecks such that when employee identification information is entered for the first time, employee hours and pay-rate are substantially concurrently entered.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of certain embodiments of the invention. For example, other embodiments of the disclosed systems and methods may or may not include the features described herein. Moreover, disclosed advantages and benefits may apply to only certain embodiments of the invention and should be not used to limit the disclosed inventions.

The present invention relates to a paycheck-centric payroll system and method for generating, accumulating and reporting on payroll information including payroll deductions.

Figure 1:
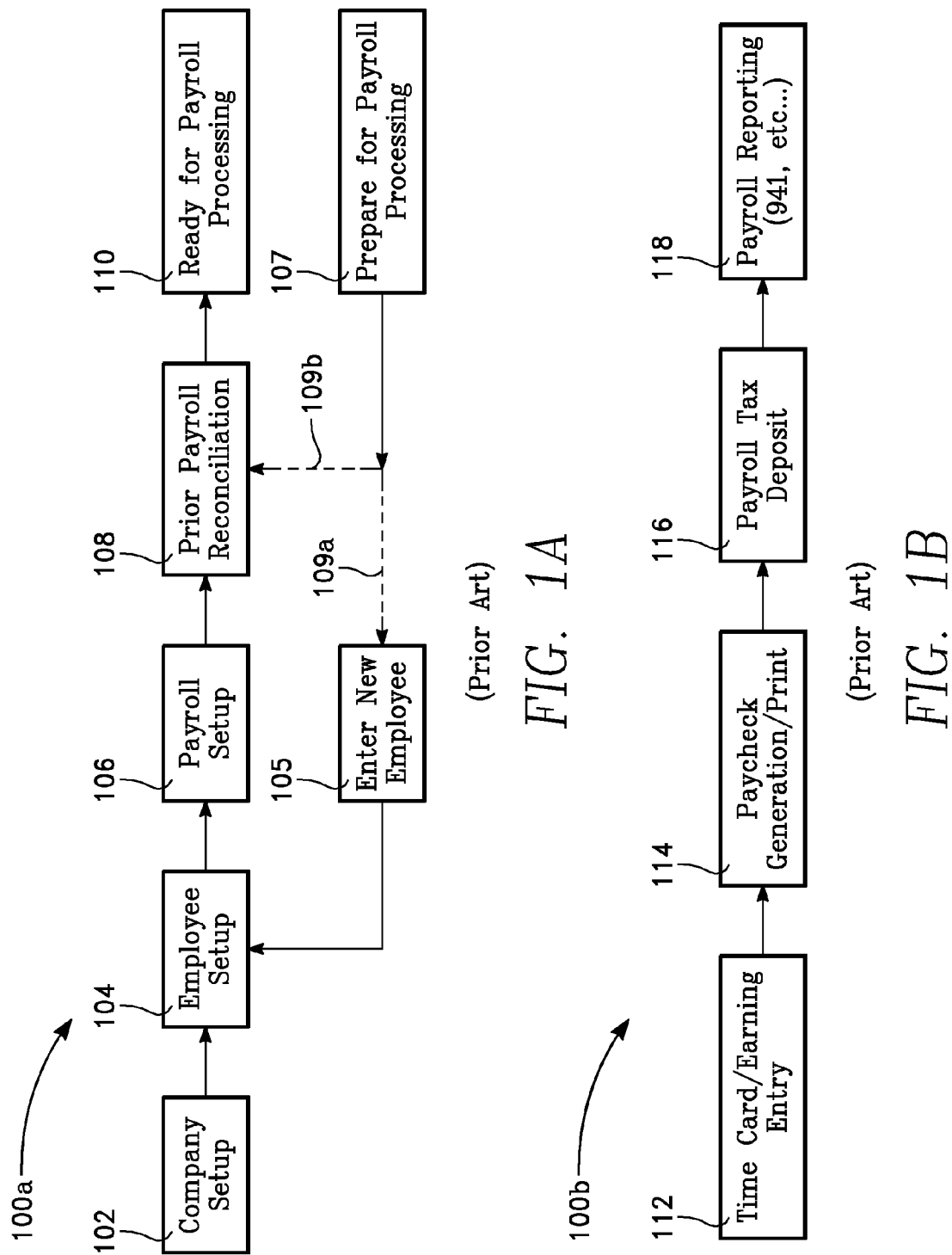
FIG. 1 shows a prior art payroll method.
Figure 2:
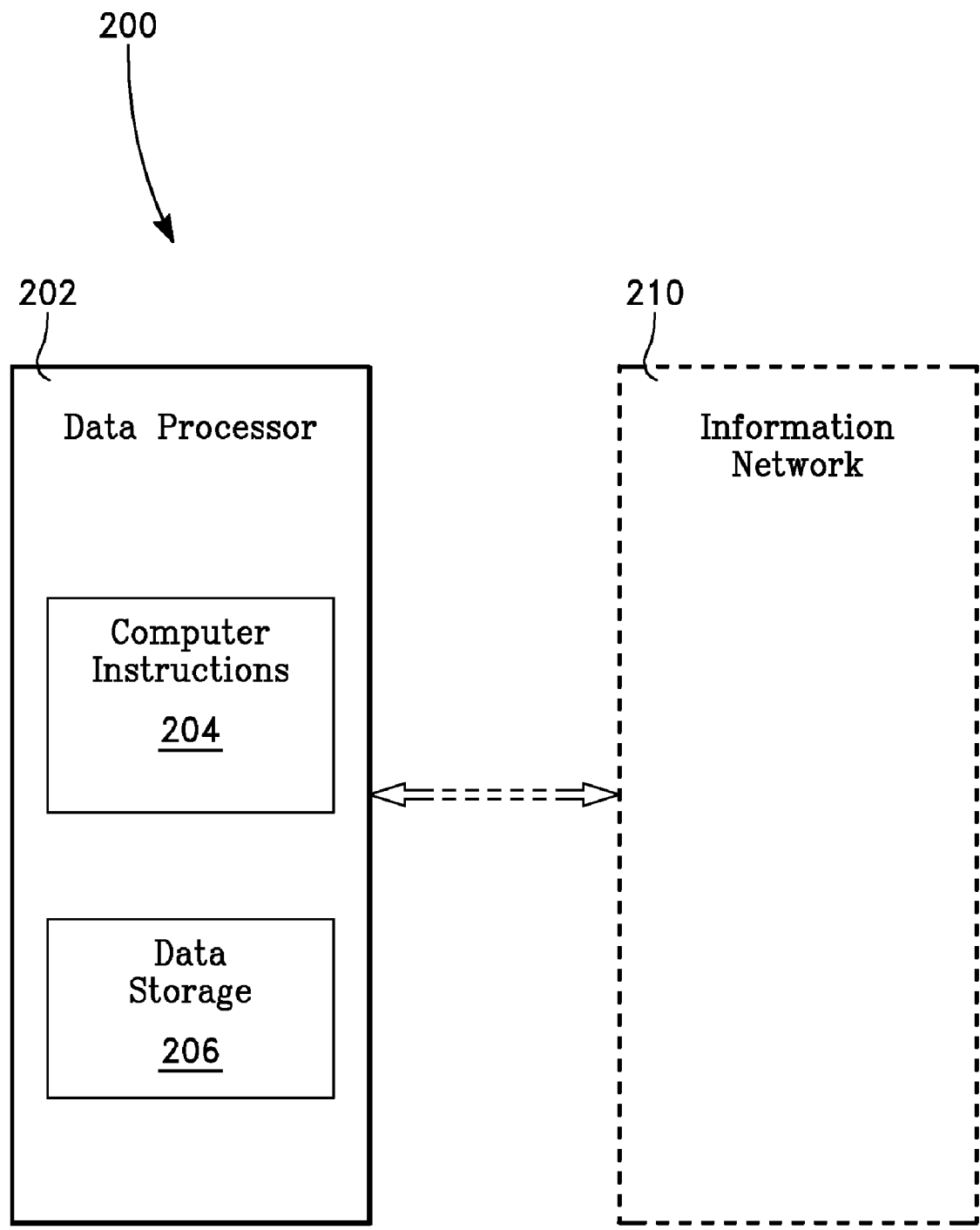
FIG. 2 shows a payroll system in accordance with the present invention.

As shown in FIG. 2, a system in accordance with the present invention 200 includes a data processor 202 with computer instructions 204 and data storage 206. In an embodiment, the data processor in interconnected with an information network 210.

As used in this specification; data processor means a device for processing data including a computer; computer means one or more digital computers, workstations or the like; and connections/interconnections refer to direct or indirect connections.

Figure 3:
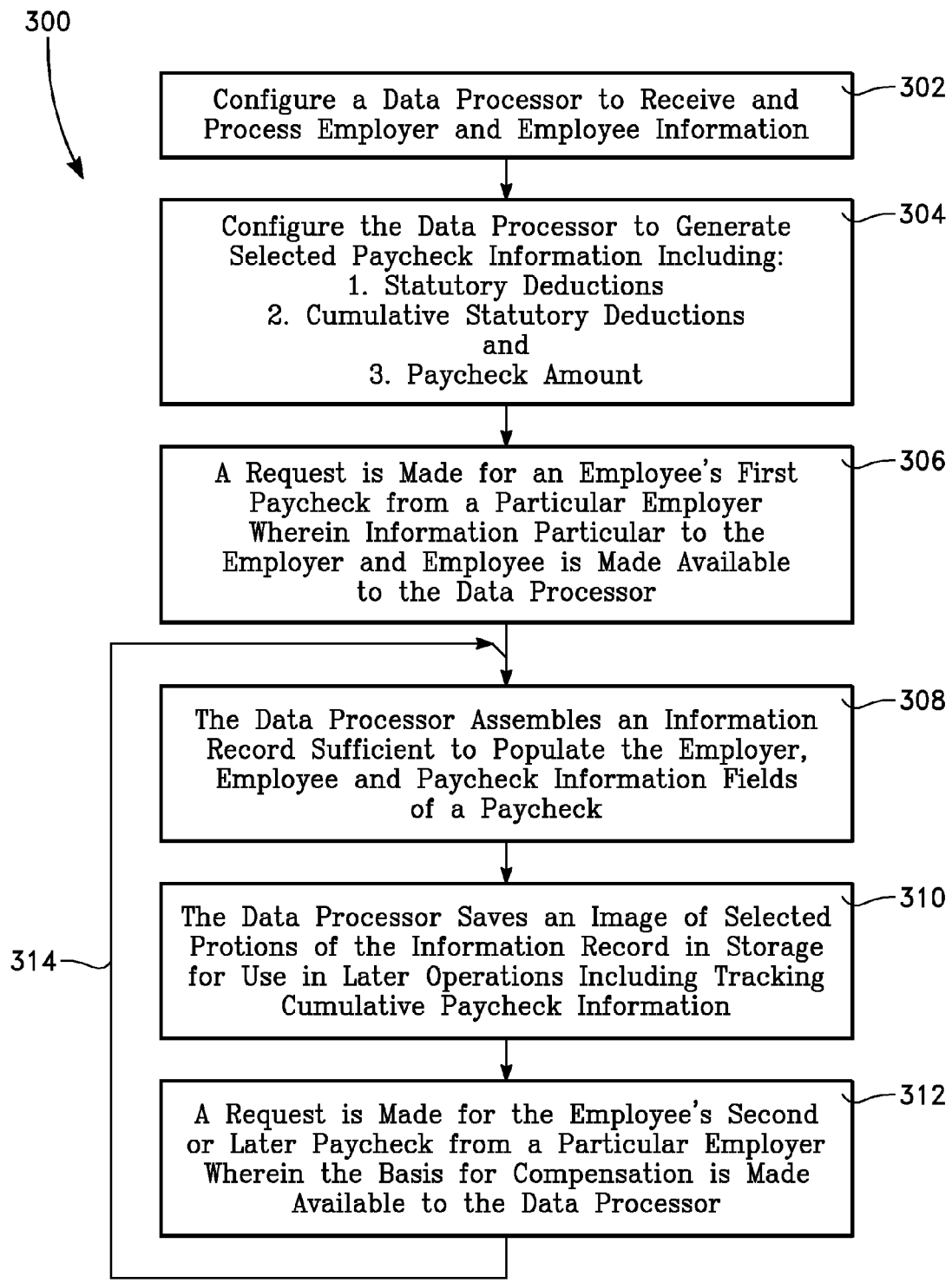
FIG. 3 shows a payroll method of the payroll system of FIG. 2.

FIG. 3 shows a flowchart of a paycheck-centric payroll management method in accordance with the present invention 300. In the method, a data processor is configured to receive and process employer and employee information 302. The data processor is also configured to generate selected paycheck information including statutory deductions (such as federal income tax, social security tax medicare tax, state income tax, disability insurance and similar statutory amounts), cumulative statutory deductions and paycheck amount. As persons of ordinary skill in the art will understand, some embodiments may implement other deductions, such as a non-statutory deductions aimed at, for example, funding an employee savings plan.

In an embodiment, prior to any paychecks having been requested from the system, the data processor is void of any information about particular employers and employees. In some embodiments it is the check request activity that first makes this information available to the data processor for storage and reuse in later operations.

In some embodiments, substantially concurrent data processor setup occurs when identification information about the employer and employee, employee pay rate, and the employee hours worked are entered at substantially the same time, as in one sitting or in short time frames such as less than about one hour.

And, in some embodiments, substantially concurrent data processor setup occurs when identification information about the employee, employee pay rate, and employee hours worked are entered at substantially the same time, as in one sitting or in short time frames such as less than about one hour.

When an employee's first paycheck from a particular employer is requested, information particular to the employer and employee is made available to the data processor by the check requester 306. In addition, the check requester enters compensation information such as hours worked and the hourly rate. The paycheck request results in the data processor assembling a paycheck information record sufficient to populate the employer, employee, and paycheck information fields of a paycheck 308. Selected potions of the paycheck information record are saved by the data processor for tracking cumulative paycheck information 310.

When an employee's second or later paycheck from a particular employer is requested, the paycheck requester makes the compensation basis available to the data processor 312 and the method returns to step 308 to assemble another paycheck information record. To the extent that deductions made from prior checks relate to the current tax year, period and accumulated tax year deductions are available for printing checks, employer/employee reports and government tax forms such as form IRS 941, Employer's Quarterly Financial Tax Return.

Figure 4:
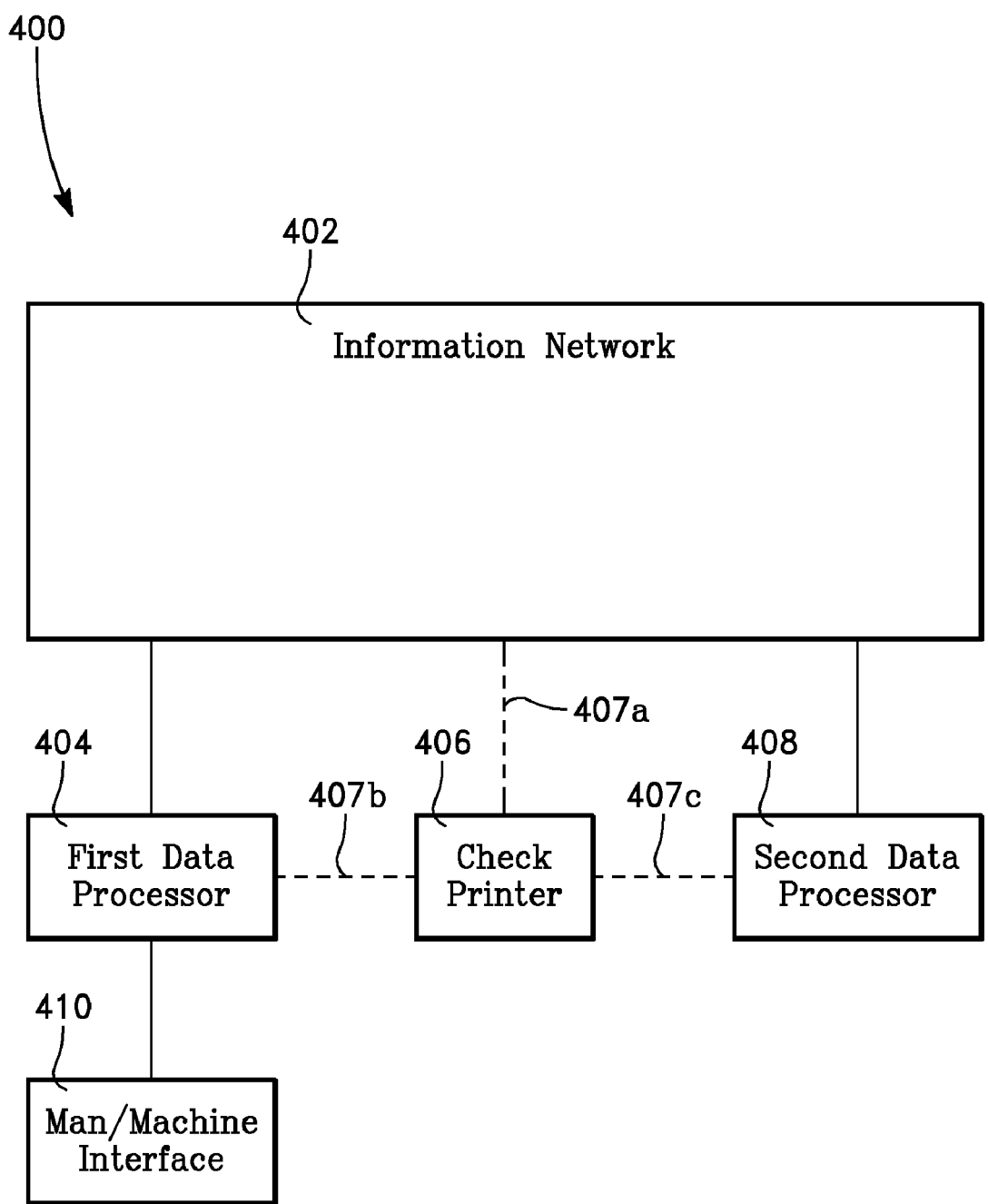
FIG. 4 shows an embodiment of the payroll system of FIG. 2 having two data processors interconnected by a network.

FIG. 4 shows a networked embodiment of the present invention 400. Here, an information network such as a local, wide-area or global (Internet) information network 402 interconnects first and second data processors 404, 408.

In one networked embodiment, the second data processor is configured as described above 302, 304 and requests 306, 312 made for an employee's paycheck are conveyed from a man-machine interface of the first data processor 410 via the network 402 to the second data processor where the information record assembly 308 and image storage 310 discussed above are carried out.

In some embodiments, a check printer 406 receives signals from one or more of the first data processor 404, the second data processor 408 and the information network 402. Because the check printer may be physically located anywhere on the network, an instruction to print a check from an information record 308 need not result in a check being printed local to either of the data processors, but can be used to print the check at any location where the check printer is attached to the network.

In another networked embodiment, the first data processor is, except for storage of information records, configured as described above 302, 304 and requests 306, 312 made for an employee's paycheck are conveyed from a man-machine interface of the first data processor 410 to the first data processor 404 where the information record assembly 308 discussed above is carried out. The information record is subsequently transported from the first data processor over the information network 402 to the second data processor 408 where it is stored for future reference 308 as is the case where an employee's second or later paycheck from a particular employer is requested.

In some embodiments, the first data processor 404 is configured to store batches of information records which are periodically transferred to the second data processor 408 via the network 402 for the purpose of generating IRS reports such as the Form 941, Employer Quarterly Federal Tax Return. Such transfers may also be used to enable the data to be saved in a suitable location such as on-line, near-line and/or off-line archival locations.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A payroll paycheck management method comprising the steps of:
   configuring a data processor to receive and process employer and employee information, said configured data processor being initially void of setup information about employers and employees;
   providing the data processor with an automatic deduction generator;
   making particular employee compensation information available to the data processor for the first time when the employee's first paycheck from the employer is requested;
   automatically generating paycheck deduction information using the automatic deduction generator of the data processor, the paycheck deduction information being based on the employee compensation information, the paycheck deduction information comprising statutory deductions;
   concurrently assembling an information record using the employer information, employee information, and the automatically generated deduction information;
   automatically populating paycheck information fields of the employee's first paycheck with the concurrently, assembled information record using the data processor;
   selecting portions of the information record;
   saving an indication of the selected portions of the information record from the employee's first paycheck for use in payroll processing.

2. A payroll paycheck management system comprising:
   an information network interconnecting first and second data processors;
   the second data processor being configured to receive and process employer and employee information, the employee information comprising employee compensation information, said second data processor being initially void of setup information about employers and employees;
   an automatic deduction generator integral to the second data processor, the automatic deduction generator configured to automatically generate paycheck deduction information based on the employee compensation information the paycheck deduction information comprising statutory deductions;
   a man-machine interface integral to the first data processor and in communication with the second data processor, the man-machine interface configured to accept employer and employee information entered at the man-machine interface of the first data processor, the employee information comprising employee compensation information, and transferred to the second data processor via the information network, said employer and employee information being made available to the second data processor for the first time when the employee's first paycheck from the employer is requested, the second data processor configured to assemble an information record comprising the employer information, employee information, and the automatically generated paycheck deduction information; an automatic paycheck field populator integral to the second data processor, the automatic paycheck field populator being configured to automatically populate the paycheck information fields of the employee's first paycheck using the information record and wherein second processor is configured to select portions of the information record and save an indication of the selected portions of the information record from the employee's first paycheck for use in payroll processing.

3. The method of claim 1, further comprising generating an employer's quarterly financial tax return using the saved selected portions of the information record from the employee's first paycheck.

4. The method of claim 3, further comprising electronically filing the employer's quarterly financial tax return.

5. The method of claim 1, further comprising generating a report, the report comprising payroll deductions.

6. The payroll paycheck management system of claim 2, wherein the second processor is configured to generate an employer's quarterly financial tax return using the saved selected portions of the information record from the employee's first paycheck.

7. The payroll paycheck management system of claim 6, wherein the second processor is configured to connect to the information network to transmit the employer's quarterly financial tax return.

8. The payroll paycheck management system of claim 2, wherein the second processor is configured to generate a report, the report comprising payroll deductions.

* * * * *